United States Patent [19]

Spannhake et al.

[11] 4,359,707
[45] Nov. 16, 1982

[54] PICTURE TUBE DEMAGNETIZING COIL ARRANGEMENT

[75] Inventors: Dieter Spannhake, Reinheim; Otto Chwalkowski, Gross-Gerau, both of Fed. Rep. of Germany

[73] Assignee: Robert Bosch GmbH, Stuttgart, Fed. Rep. of Germany

[21] Appl. No.: 184,993

[22] Filed: Sep. 8, 1980

[30] Foreign Application Priority Data

Nov. 15, 1979 [DE] Fed. Rep. of Germany ....... 2946061

[51] Int. Cl.³ .............................................. H01F 13/00
[52] U.S. Cl. ........................................ 335/284; 315/8; 361/150
[58] Field of Search .............. 335/284; 315/8; 307/91, 307/101; 361/150

[56] References Cited

U.S. PATENT DOCUMENTS

| 2,962,622 | 11/1960 | Popovich | 335/284 X |
| 3,340,443 | 9/1967 | Rieth et al. | 315/8 X |
| 3,445,730 | 5/1969 | Kahn | 335/284 X |

FOREIGN PATENT DOCUMENTS

| 1282679 | 11/1968 | Fed. Rep. of Germany . |
| 1439710 | 1/1969 | Fed. Rep. of Germany . |
| 7030109 | 11/1970 | Fed. Rep. of Germany . |
| 2014993 | 2/1972 | Fed. Rep. of Germany . |
| 2809725 | 9/1979 | Fed. Rep. of Germany . |
| 6945729 | 11/1979 | Fed. Rep. of Germany . |

*Primary Examiner*—G. Z. Rubinson
*Assistant Examiner*—S. D. Schreyer
*Attorney, Agent, or Firm*—Frishauf, Holtz, Goodman & Woodward

[57] ABSTRACT

A demagnetizing coil is situated in an aperture frame removably mounted around the picture screen of a picture tube.

1 Claim, 3 Drawing Figures

FIG.1
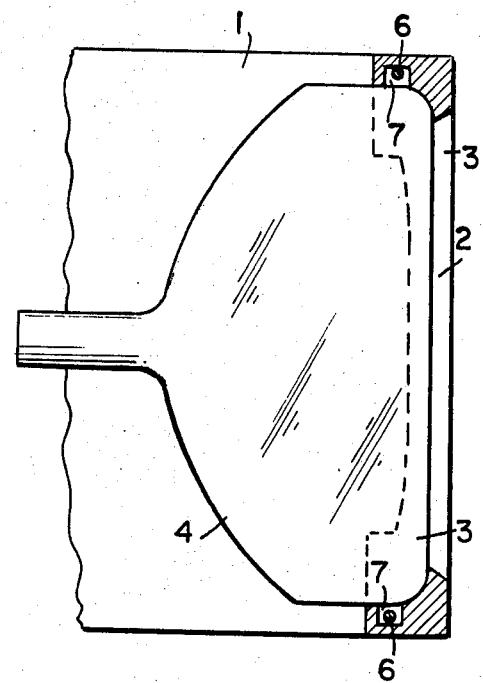
FIG.2
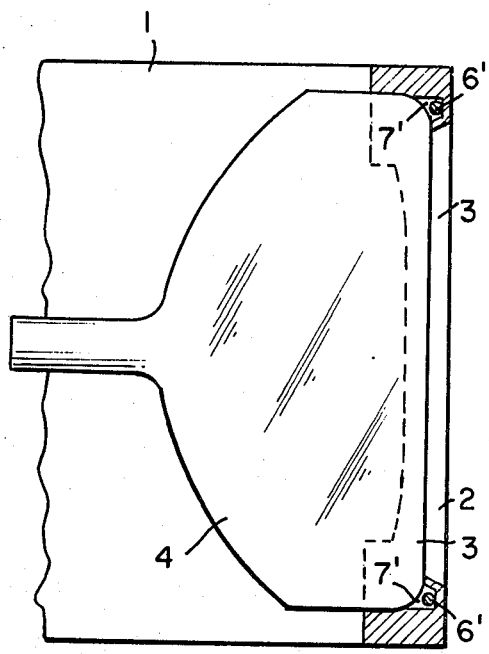
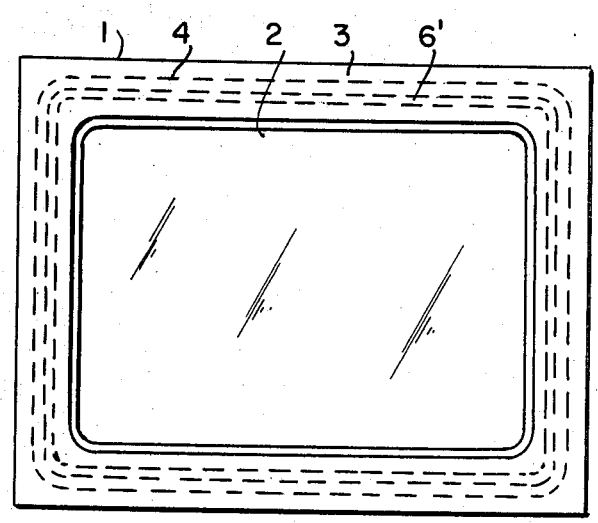
FIG.3

PICTURE TUBE DEMAGNETIZING COIL ARRANGEMENT

This invention concerns the arrangement of a demagnetizing coil for a picture tube.

It is known to provide a picture tube with a magnetic shielding and to equip it with a demagnetizing coil for the purpose of compensating the effect of the magnetic field of the earth and of magnetic scatter fields on the operation of a color picture tube of a color television set, as described in German patent document (AS) No. 2014993. It is further known from German utility model Nos. 6945729 and 7030109 to fasten a demagnetizing coil over the conical part of a picture tube and on a metal frame. These arrangements are very costly and their fabrication is time-consuming and they have the further disadvantage that their effectiveness is relatively small because they are not in immediate proximity of the components to be demagnetized. On the other hand, they are relatively close to the deflecting coils resulting in a danger of mutual interference. So as to avoid these drawbacks, a cathode ray tube and, in particular, a color picture tube is known from German patent document (OS) No. 1439710 where demagnetizing coils are placed in a rigid frame for the protection against implosion, which frame is placed on a portion of the wall which is in the vicinity of the picture screen. This arrangement of demagnetizing coils, however, has the disadvantage that it is difficult to adjust the designated operating parameters of the demagnetizing coils, when the picture tube is operated with different supply voltages. A further disadvantage lies in the fact that picture tubes cannot be used which have an optimal picture screen diagonal, that is, a diagonal on the picture screen which is approximately equal to the opening of the housing. Attachment of demagnetizing coils in the region of the suspension of the picture tube is disadvantageous further in view of the risk of fracture.

SUMMARY OF THE INVENTION

Briefly, in order to overcome the disadvantages of prior demagnetizing coil arrangements, a demagnetizing coil is held in a removable aperture frame which surrounds the picture screen of the picture tube. Preferably, the coil is fastened in a groove, for example, adhesively. In particular, the coil may be constituted of wire surrounded by a thermoplastic material, briefly heated by a current pulse by which the material is fused to the plastic material of which the aperture frame is made. The coil is preferably electrically energized by the power supply of the television receiver served by the picture tube and a switch is provided to separate the coil from the voltage supply when the demagnetization has been provided.

The arrangement according to the invention has the advantage of allowing the attachment of the coil in the aperture frame easily and without great expenditure of time and without additional attaching fixtures. At the same time, the aperture frame which typically consists of a plastic material provides for effective insulation and a good protection against mechanical damage. Arrangement of the coil separate from the image tube makes possible a free choice of operating parameters at the place of manufacture, that is, free choice of diameter of wire and winding number of the coil as well as of the associated circuitry so as to fix initial demagnetizing current and final demagnetizing current. In the case of potential use of the color television receiver with differing supply voltages, it is possible to exchange coils by exchanging the aperture frame when the demagnetizing device is directly attached to a supply voltage. In case of a change of picture tube, it is not necessary to also exchange the coil so that in this case, too, there is no need for additional assembly steps. This coil arrangement is applicable also, for example, for a measuring and compensating winding on a cathode ray tube. See, for example, German patent document (OS) No. 2809725.

THE DRAWINGS

Two specific embodiments of the invention are depicted in the drawing and are explained in detail in the following description.

FIG. 1 shows a cross-section of the front portion of one embodiment of a color television receiver equipped with a demagnetizing coil disposed in accordance with the invention.

FIG. 2 is a cross-section like FIG. 1 showing another embodiment of the invention.

FIG. 3 shows a frontal view of the coil in the frame.

DESCRIPTION OF THE ILLUSTRATED EMBODIMENTS

In a housing 1 whose frontal opening 2 picture window is surrounded with an aperture frame 3 consisting of a plastic material there is located color television tube 4. For the purpose of demagnetizing magnetizable metallic parts which are arranged in the picture tube 4 such as perforated mask metal frames and internal shielding, a demagnetizing coil is provided that functions and is connected in a known way (see published German patent application DE-AS No. 1282679). This demagnetizing coil is designated 6 in FIG. 1 and 6' in FIG. 2. It is fastened in a groove designated 7 in FIG. 1 or 7' in FIG. 2, as the case may be, of the aperture frame 3. Coil 6 or 6' located in proximity of the picture frame and situated around picture tube 4 or located in front of picture tube 4, is located as close as possible over the glass picture tube. It is desired, however, in case there is no additional isolation between glass surface and coil, to maintain a distance of a few millimeters in order to guard against arcing. In this fashion, an aperiodically declining alternating field of the demagnetizing coil 6 or 6', respectively, which is produced by the conventional demagnetizing circuitry (not shown) operates from the rim of the picture screen on the parts of the picture tube 4 which are to be demagnetized. Coil 6 or 6' which is to be placed in groove 7 or 7' may be fastened in aperture frame 3 either with fastening bolts, clamps or adhesive. An additional fastening possibility is provided in case of use of wire with thermoplastic coating for coil 6 or 6', respectively. After winding and inserting coil 6 or 6', respectively, in groove 7 or 7', respectively, the coil is heated for a short time by means of a current pulse resulting not only in fusing together of adjoining wires, but also in fusing of external wires with the thermoplastic frame 3.

Although the invention has been described with reference to a particular illustrative embodiment, it is evident that variations are possible within the inventive concept.

We claim:

1. In a housing with a frontal opening for a picture tube display, the frontal opening accommodating a removable aperture frame which covers the frontal juncture of the housing and the picture tube, the improvement comprising:
a demagnetizing device for a picture tube for receiving demagnetizing current in a demagnetizing procedure, comprising a removable aperture frame (3) which closely surround the picture screen of a picture tube (4) and a coil (6,6') around the periphery of, and held on and within said aperture frame.

* * * * *